US012018934B2

(12) United States Patent
Lin

(10) Patent No.: US 12,018,934 B2
(45) Date of Patent: Jun. 25, 2024

(54) IDENTIFICATION SYSTEM AND METHOD FOR IDENTIFYING INSTALLATION POSITIONS OF SENSORS

(71) Applicant: HIWIN TECHNOLOGIES CORP., Taichung (TW)

(72) Inventor: Yu-Hsin Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 2 days.

(21) Appl. No.: 17/648,742

(22) Filed: Jan. 24, 2022

(65) Prior Publication Data

US 2023/0236011 A1  Jul. 27, 2023

(51) Int. Cl.
*G01B 21/16* (2006.01)
(52) U.S. Cl.
CPC ..................... *G01B 21/16* (2013.01)
(58) Field of Classification Search
CPC ........ B23Q 15/22; G01B 21/00; G01B 21/16; G01C 21/183; G01C 25/00; G01C 25/005
See application file for complete search history.

(56) References Cited

U.S. PATENT DOCUMENTS

| | | | | |
|---|---|---|---|---|
| 5,834,623 A * | 11/1998 | Ignagni | ................ | G05B 19/401 73/1.79 |
| 8,006,557 B2 * | 8/2011 | Yin | ....................... | G01P 15/125 73/514.01 |
| 9,810,549 B2 * | 11/2017 | Johnson | ............... | G01C 25/005 |
| 2011/0123285 A1 * | 5/2011 | Matsuda | ................ | B23Q 1/623 409/313 |
| 2011/0301901 A1 * | 12/2011 | Panagas | ............... | G01C 25/005 702/104 |
| 2015/0000147 A1 * | 1/2015 | Chang | .................. | G01B 5/0009 33/503 |
| 2021/0095961 A1 * | 4/2021 | Sato | ....................... | G06F 3/0346 |

FOREIGN PATENT DOCUMENTS

TW          I701101 B       8/2020
TW          I792774 B   *  11/2023

OTHER PUBLICATIONS

English translation of TW-I792774-B (Lin) (Year: 2023).*

* cited by examiner

*Primary Examiner* — Alvaro E Fortich
*Assistant Examiner* — Martin Walter Braunlich
(74) *Attorney, Agent, or Firm* — Wang Law Firm, Inc.

(57) ABSTRACT

A method for identifying installation positions of sensors, which predefines the corresponding relationship between the first sliding member, the second sliding member and the signal features according to the installation directions of the sensors, and then drives the first sliding member and the second sliding member of one of the feed systems to move to obtain and analyze the three-axis signals fed back from the sensors, firstly select responsive three-axis signals, and then determine the axis with the largest response of the three-axis signals so as to identify the sensor installed on the first sliding member. Then, the corresponding relationship between the remaining three-axis signals and the sensors installed on the second sliding members is identified based on the dynamic signal feature and the static signal feature, so as to achieve the purpose of automatically identifying the installation position of the respective sensors.

8 Claims, 13 Drawing Sheets

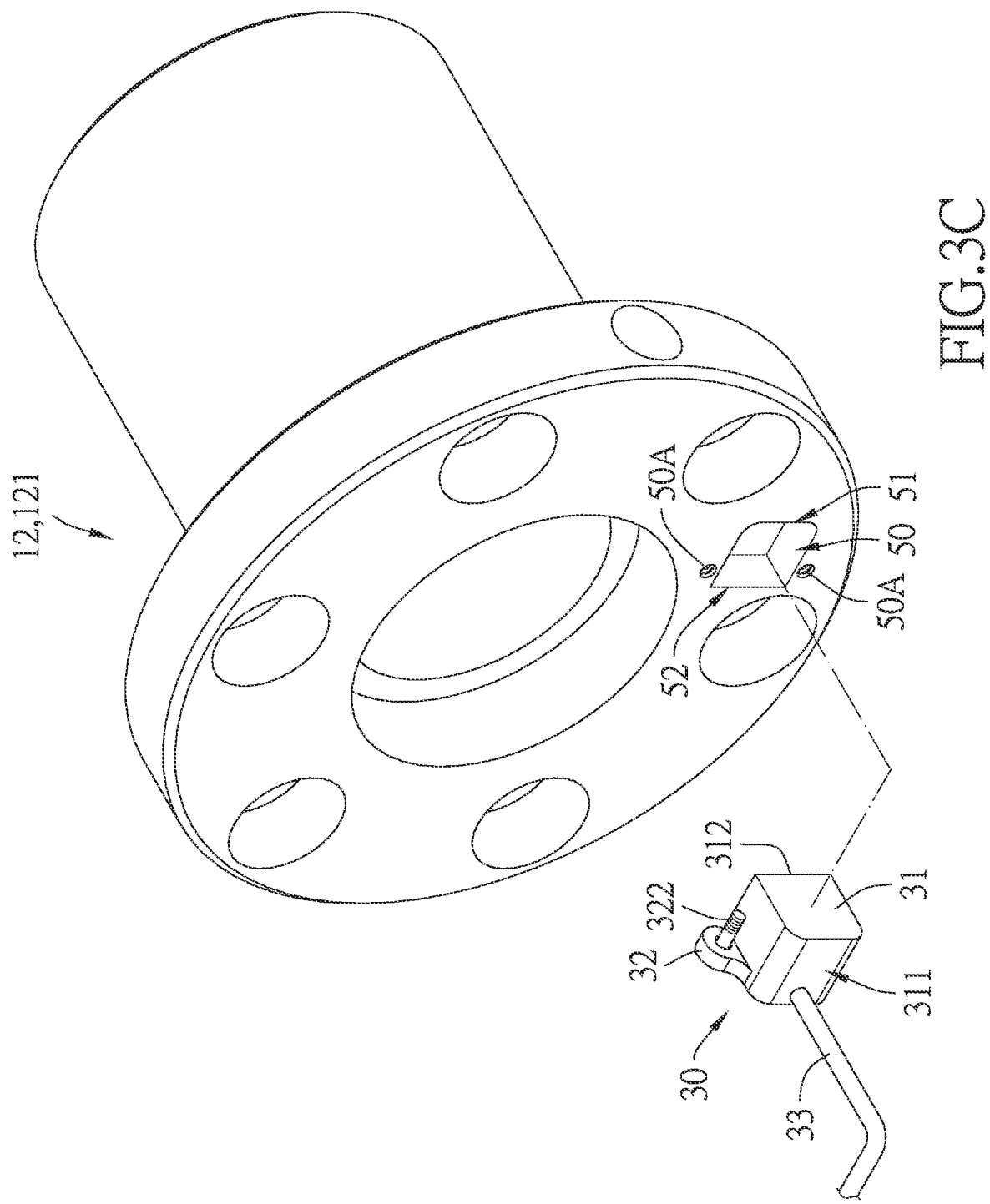

IDENTIFICATION SYSTEM AND METHOD FOR IDENTIFYING INSTALLATION POSITIONS OF SENSORS

BACKGROUND

Field of the Invention

The present invention relates to an identification system for automatically identifying installation positions of sensors.

The present invention further relates to a method for identifying installation positions of sensors.

Description of Related Art

Under the trend of Industry 4.0 and smart machinery, more and more sensors will be embedded in machine equipment. However, because there are too many sensors of the same type, it will cause confusion about the corresponding status of the sensors and the corresponding parts. In order to overcome the aforementioned problems, Taiwan Patent No. 1701101 disclosed a linear actuator and its identification method. However, the identification function still needs to be achieved through the embedded device provided within the linear actuator. The embedded device must be pre-stored with the activation serial number and the parameter of the linear actuator. In this way, if an installation error during the installation of the embedded device, it will affect the correctness of the judgment, there is a need for a system and method that can identify the position of the sensor without adding any embedded device in advance.

SUMMARY

The present invention provides an identification system for identifying installation positions of sensors, and the main objective of which is to automatically identify the installation positions of the respective sensors.

To achieve the above objective, an identification system for identifying installation positions of sensors provided by the invention, comprises:

at least one feed systems linearly movable along a driving direction, and including a first sliding member, and a plurality of second sliding members;

the sensors respectively installed on the first sliding member and the second sliding members, wherein each of the sensors defines a three-dimensional coordinate system and forms a three-axis signal, each of the three-dimensional coordinate systems includes three axes, one of the axes corresponds to a gravity direction, each of the three-axis signals includes a signal feature, the three-dimensional coordinate system formed by the sensor mounted on the first sliding member is a first coordinate system, the three-dimensional coordinate systems formed by the sensors mounted on the second sliding members are second coordinate systems, the first coordinate system and the second coordinate systems use different axes to indicate the driving direction, and the second coordinate systems indicate the driving direction with different directions of the same axis or uses different directions of the same axis to indicate the gravity direction; and a processing device storing a comparison information, the comparison information containing a corresponding relationship between the first sliding member, the second sliding members and the signal feature, the processing device comparing the three-axis signals to obtain the signal feature, and obtain the installation positions of the sensors based on the comparison information.

The present invention further provides a method for identifying installation positions of sensors, which comprises the following steps:

(A) defining a corresponding relationship between a first sliding member, a plurality of second sliding members and a signal feature, the signal feature including a dynamic signal feature and a static signal feature;

(B) driving the first sliding member and the second sliding members to linearly move in a driving direction;

(C) receiving three-axis signals transmitted from the sensors installed on the first sliding member and the second sliding members, each of the three-axis signals including an output signal for each of three axes;

(D) identifying the axis with the largest response from each three-axis signal, and the three-axis signals with the largest response on the same axis corresponds to the sensors installed on the second sliding members, and the three-axis signal with the largest response on another axis corresponds to the sensor installed on the first sliding member, so as to identify the sensor installed on the first sliding member;

(E) defining the three-axis signal of the sensor mounted on the first sliding member as a first signal, and the three-axis signal of the sensor mounted on each of the second sliding members as a second signal, comparing the output signal of the axis with the largest response of the first signal with the output signal of the axis with the largest response of the second signals, and determining the similarity and difference of the oscillation directions of the output signals to obtain a determination result, and the determination result is the dynamic signal feature;

(F) comparing each of the second signals with the output signal of the axes corresponding to a gravity direction, distinguishing the second signals whose output signal is positive and the second signals whose output signal is negative to obtain a result, and the result is the static signal feature; and (G) obtaining corresponding relationship between each of the second signals and the second sliding members based on the dynamic signal feature and the static signal feature, so as to identify the sensors installed on the respective second sliding members.

In this way, this invention mainly predefines the corresponding relationship between the first sliding member, the second sliding member and the signal features according to the installation directions of the sensors, and then drives the first sliding member and the second sliding member of one of the feed systems to move to obtain and analyze the three-axis signals fed back from the sensors, firstly select responsive three-axis signals, and then determine the axis with the largest response of the three-axis signals so as to identify the sensor installed on the first sliding member. Then, the corresponding relationship between the remaining three-axis signals and the sensors installed on the second sliding members is identified based on the dynamic signal feature and the static signal feature, so as to achieve the purpose of automatically identifying the installation position of the respective sensors.

BRIEF DESCRIPTION OF THE DRAWINGS

FIG. 3C is a schematic view of the shape of the sensor and the accommodating hole being asymmetrical;

DETAILED DESCRIPTION

Figure 1:
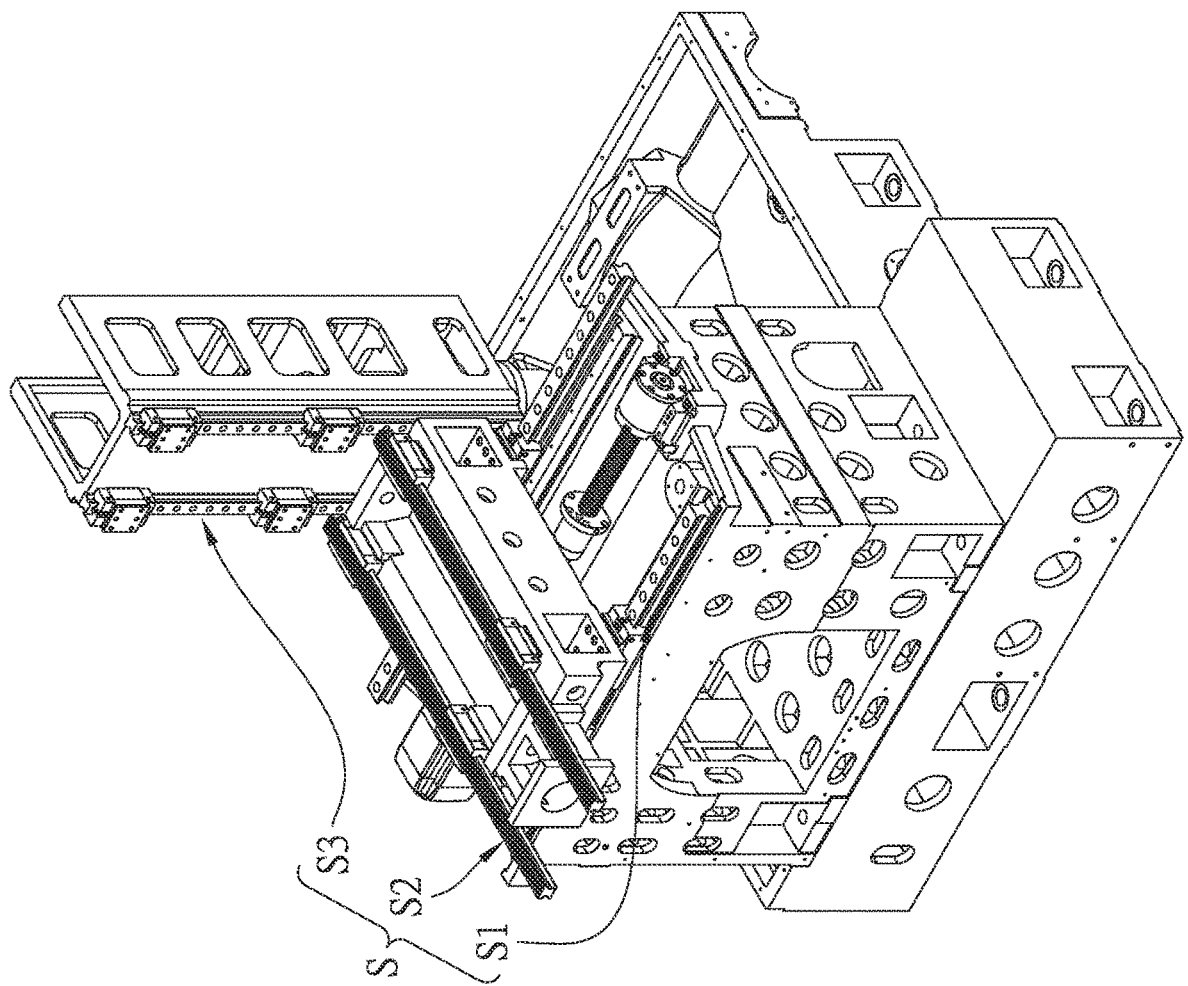
FIG. 1 is a schematic view of a three-axis vertical processing machine.

The present invention provides an identification system for identifying installation positions of sensors. One of the embodiments of the invention, as shown in FIGS. 1 to 9, comprises:

A plural feed systems S respectively act in a driving direction D, and the driving directions D of the feed systems S are perpendicular to each other. For example, please refer to FIG. 1, generally, a three-axis vertical processing machine includes three feed systems S that moves along different driving directions D, which are a first feed system S1, a second feed system S2, and a third feed system S3. The driving direction D of the first feed system S1 is a first direction D1, the driving direction D of the second feed system S2 is a second direction D2, and the driving direction D of the third feed system S3 is a third direction D3, and the first direction D1, the second direction D2 and the third direction D3 are perpendicular to each other.

Each of the feed systems S includes a plurality of transmission units, and the transmission units can further be divided into a main transmission unit 10 and a plurality of auxiliary transmission units 20. The main transmission unit 10 includes a first elongated shaft 11 and a first sliding member 12, and the first sliding member 12 is sleeved on the first elongated shaft 11 and linearly movable along the driving direction D. Each of the auxiliary transmission units 20 includes a second elongated shaft 21 and a second sliding member 22, and the second sliding member 22 is sleeved on the second elongated shaft 21 and linearly movable along the driving direction D. In this embodiment, the number of the main transmission unit 10 is one, the main transmission unit 10 is a ball screw, the first sliding member 12 is a nut 121, the first elongated shaft 11 is a screw rod, the number of the auxiliary transmission units 20 is two, each of the auxiliary transmission units 20 is a linear slide, the second sliding member 22 is a sliding block 221, and the second elongated shaft 21 is a rail 211.

In this embodiment, the above-mentioned two auxiliary transmission units 20 each include two second sliding members 22 arranged one second elongated shaft 21, so the total number of the second sliding members 22 is four, but is not limited to this. In other embodiments, it can also be that one second sliding member 22 is provided on one second elongated shaft 21.

A plurality of sensors 30 are respectively installed on the first sliding member 12 and the second sliding member 22 of the feed systems S, and the measurement range of each sensor 30 must include at least a frequency bandwidth above 1 Hz. Each of the sensors 30 defines a three-dimensional coordinate system C and respectively forms a three-axis signal L, each of the three-axis signals L includes a signal feature, and each of the three-dimensional coordinate systems C includes three mutually perpendicular axes 91, 92 and 93, such as X-axis, Y-axis and Z-axis. The axis 93 corresponds to a gravity direction G, the three-axis signals L each include output signals of the three axes 91, 92 and 93, and the output signals are acceleration changes generated by the respective axes 91, 92 and 93. The orientation of each sensor 30 will affect the directions of the three-dimensional coordinate systems C. For example, if the Z-axis direction is perpendicular to the ground and the X-axis and Y-axis directions are parallel to the ground, the Z-axis corresponds to gravity direction G, therefore, the output of the X-axis and Y-axis directions is 0 g acceleration (gravity), and the Z-axis direction will receive 1 g or −1 g acceleration (gravity). The positive or negative of the above values depends on the orientations of the sensor 30. Each of the axes 91, 92 and 93 has two opposite directions, one of which is a positive direction, the other is a negative direction, and the difference between the positive direction and the negative direction is 180 degrees. In this embodiment, the sensor 30 can be, for example, but not limited to, a three-axis accelerometer.

Suppose that the three-dimensional coordinate system C formed by the sensor 30 mounted on the first sliding member 12 is a first coordinate system C1, and the three-dimensional coordinate systems C formed by the sensors 30 mounted on the second sliding member 22 are second coordinate systems C2. The first coordinate system C1 and the second coordinate systems C2 use different axes 91 and 92 to indicate the driving directions D, and the second coordinate systems C2 indicate the driving directions D with different directions of the same axis 92 or uses different directions of the same axis 93 to indicate the gravity direction G. Please refer to FIG. 2, in this embodiment, the first coordinate system C1 indicate the driving direction D with the X-axis, and the second coordinate systems C2 indicate the driving direction D with the Y-axis. Two of the second coordinate systems C2 indicate the driving direction D with the negative directions of the Y-axes, and the other two second coordinate systems C2 use the positive directions of the Y-axes to represent the driving direction D. Two of the second coordinate systems C2 use the positive directions of the Z-axes to represent the gravity direction G, which has an acceleration of 1 g (gravity), and the other two second coordinate systems C2 use the negative directions of the Z-axes to represent the gravity direction G, which has an acceleration (gravity) of −1 g.

Figure 7:
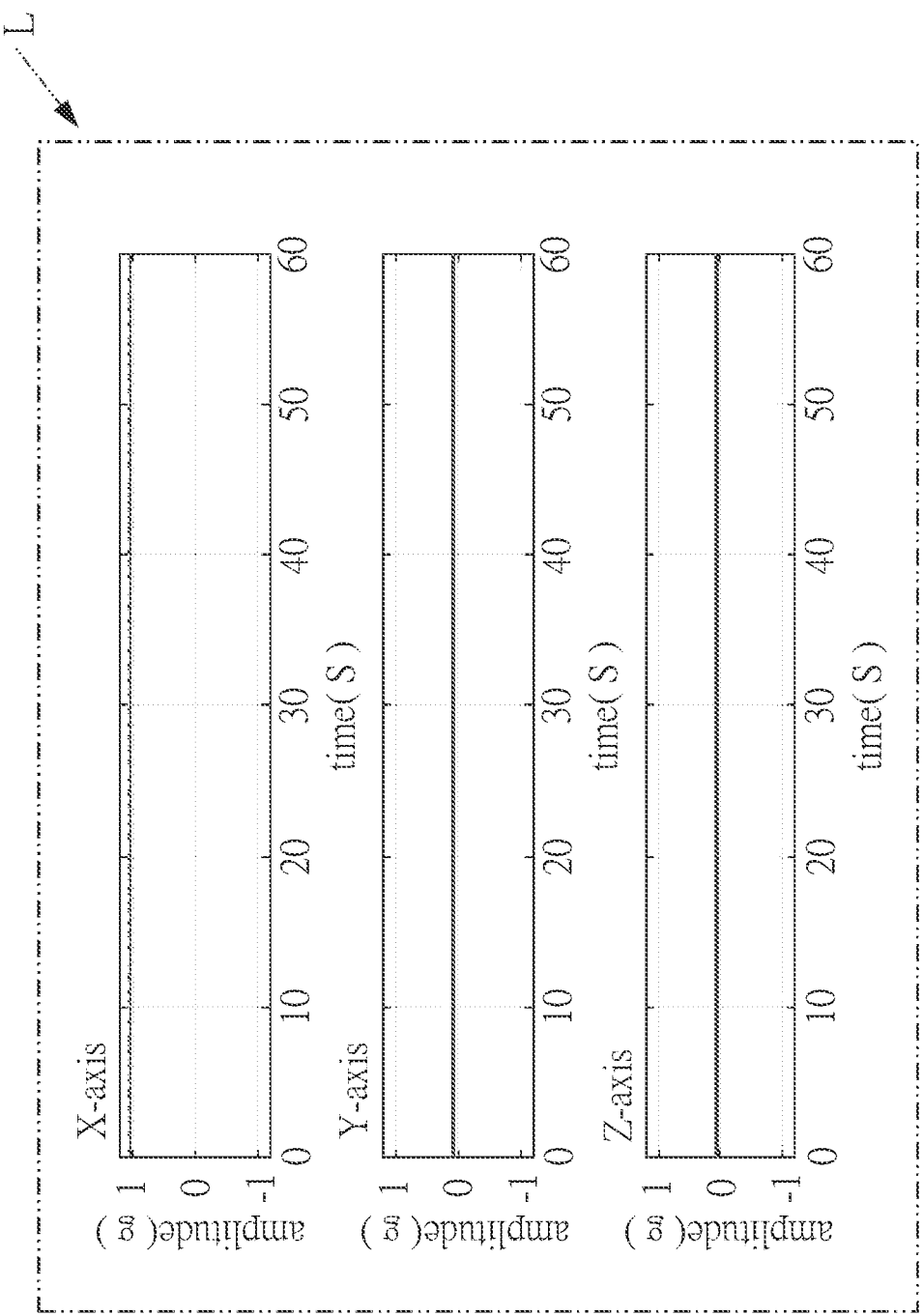
FIG. 7 is a schematic view of the three-axis signal generated by the sensor installed in the feed system that is not moving.
Figure 8A:
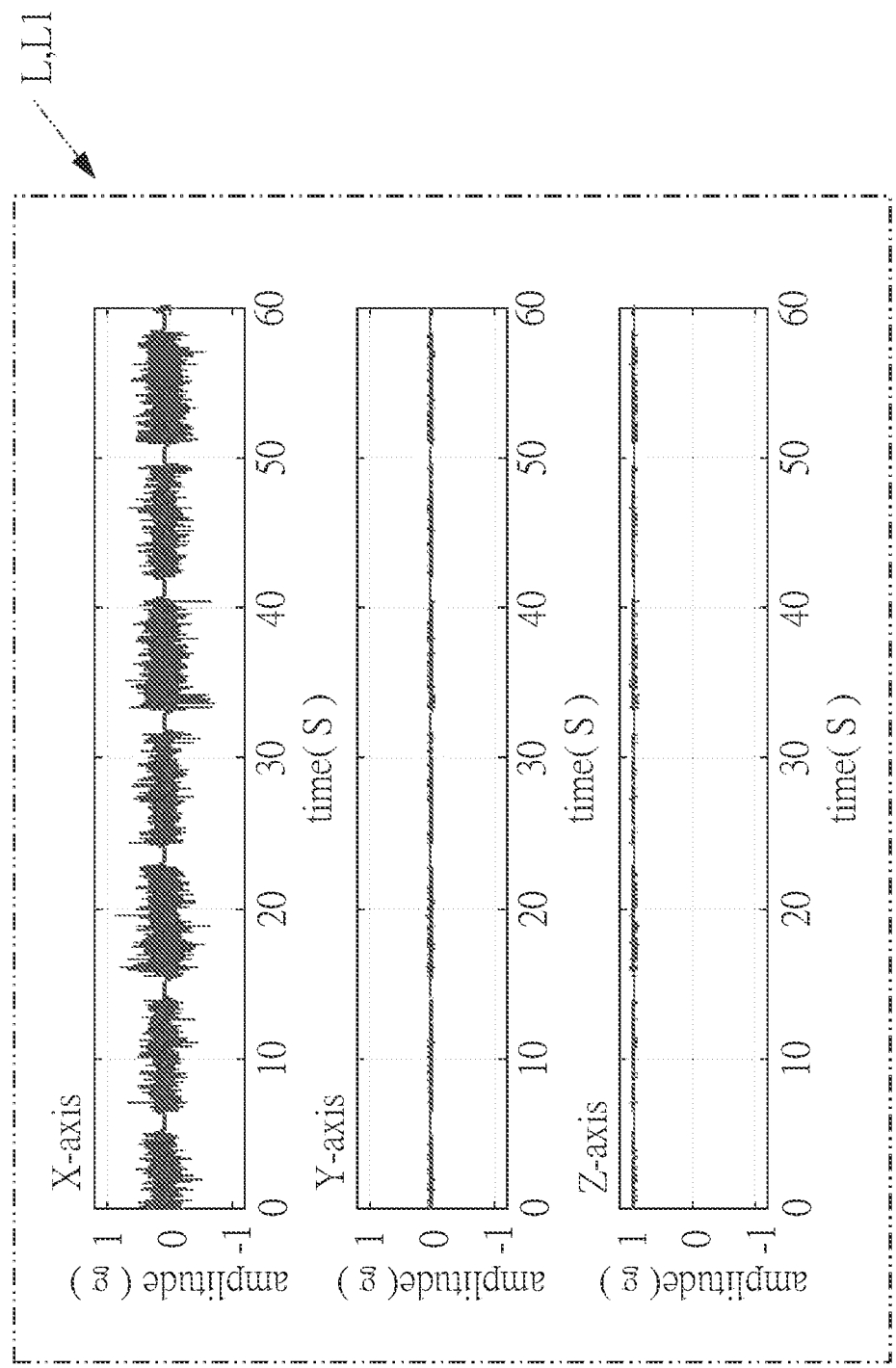
FIG. 8A is a schematic view of the first signal.
Figure 8B:
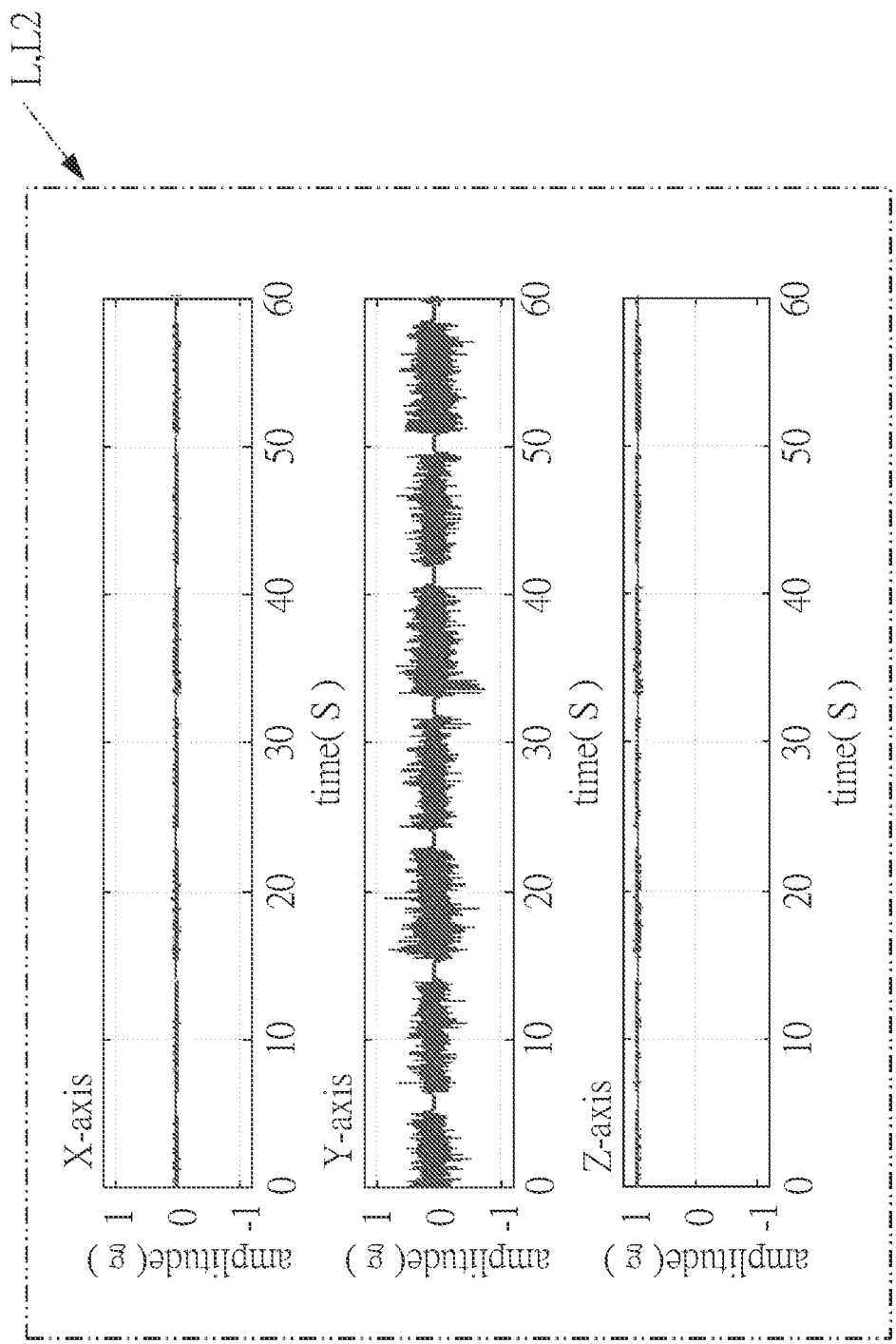
FIG. 8B is a schematic view of the second signal.

A processing device 40 includes a receiving unit 41, a storage unit 42 and a comparison unit 43 connected to each other. The receiving unit 41 is signally connected to the sensors 30 to receive the three-axis signals L, the storage unit 42 pre-stores a comparison information, the comparison information is related to the orientation of the sensors 30, and the comparison information contains a corresponding relationship between the first sliding member 12, the second sliding members 22 and the signal feature. The comparison unit 43 is provided for analyzing and comparing the three-axis signals L to obtain the signal features of each three-axis signal L, and obtain corresponding relationship between each three-axis signal L and the sensors 30 installed on the first sliding member 12 and the second sliding members 22 based on the comparison information. In this embodiment, responsive three-axis signals L are selected from a plurality of three-axis signals L, as shown in FIGS. 7, 8A, and 8B. In FIG. 7, the output signals of the axes 91, 92 and 93 are static, which means that the three-axis signals L are non-responsive. In FIGS. 8A and 8B, the output signal of one axis 91 or 92 is obviously responsive, which means that the three-axis signal L is a responsive signal, and then determine the axis 91 or 92 with the largest response of the three-axis signals L. Please refer to FIG. 8A, the axis 91 with the largest response is the X-axis, please refer to FIG. 8B, the axis 92 with the largest response is the Y-axis, there will be multiple three-axis signals L with the largest response on the same axis 92, and one three-axis signal L with the largest response on another axis 91. The multiple three-axis signals L with the largest response on the same axis 92 are defined as the second signals L2, and the three-axis signal L with the largest response on another axis 91 is defined as a first signal L1, the second signals L2 correspond to the second sliding member 22, and the first signal L1 corresponds to the first sliding member 12.

The signal feature includes a coordination feature, a dynamic signal feature, and a static signal feature. The axis 91, 92 or 93 with the largest response is the coordinate feature, and the dynamic signal means the similarity and difference between the direction of the output signal of the axis 92 with the largest response of the second signal L2 and the direction of the output signal of the axis 91 with the largest response of the first signal L1. Please refer to FIG. 9, which shows the comparison the output signal of the axis 91 with the largest response of the first signal L1 and the output signal of the axis 92 with the largest response of the two second signals L2, wherein the output signal of one second signal L2 is opposite to the output signal of the first signal L1, and the output signal of the other second signal L2 is the same as the output signal of the first signal L1.

The static signal feature is the positive and negative value of the output signal of the axis 93 corresponding to the gravity direction G of the second signal L2. For specific description of the static signal feature, please refer to FIG. 2, two of the second coordinate systems C2 use the negative direction of the Y-axis to indicate the driving direction D, and the other two second coordinate systems C2 indicate the driving direction D with the positive direction of the Y-axis. In the second coordinate systems C2 that indicate the driving direction D with the positive direction of the Y-axis, one of the second coordinate systems C2 uses the positive direction of the Z-axis represents the gravity direction G, which has an acceleration of 1 g (gravity), another second coordinate system C2 uses the negative direction of the Z-axis to indicate the gravity direction G, which has an acceleration (gravity) of −1 g. In the second coordinate systems C2 that use the negative direction of the Y-axis to represent the driving direction D, one of the second coordinate system C2 uses the positive direction of the Z-axis to indicate the gravity direction G, which has an acceleration (gravity) of 1 g, and the other second coordinate system C2 uses the negative direction of the Z-axis to indicate the gravity direction G, which has an acceleration (gravity) of −1 g.

Figure 2:
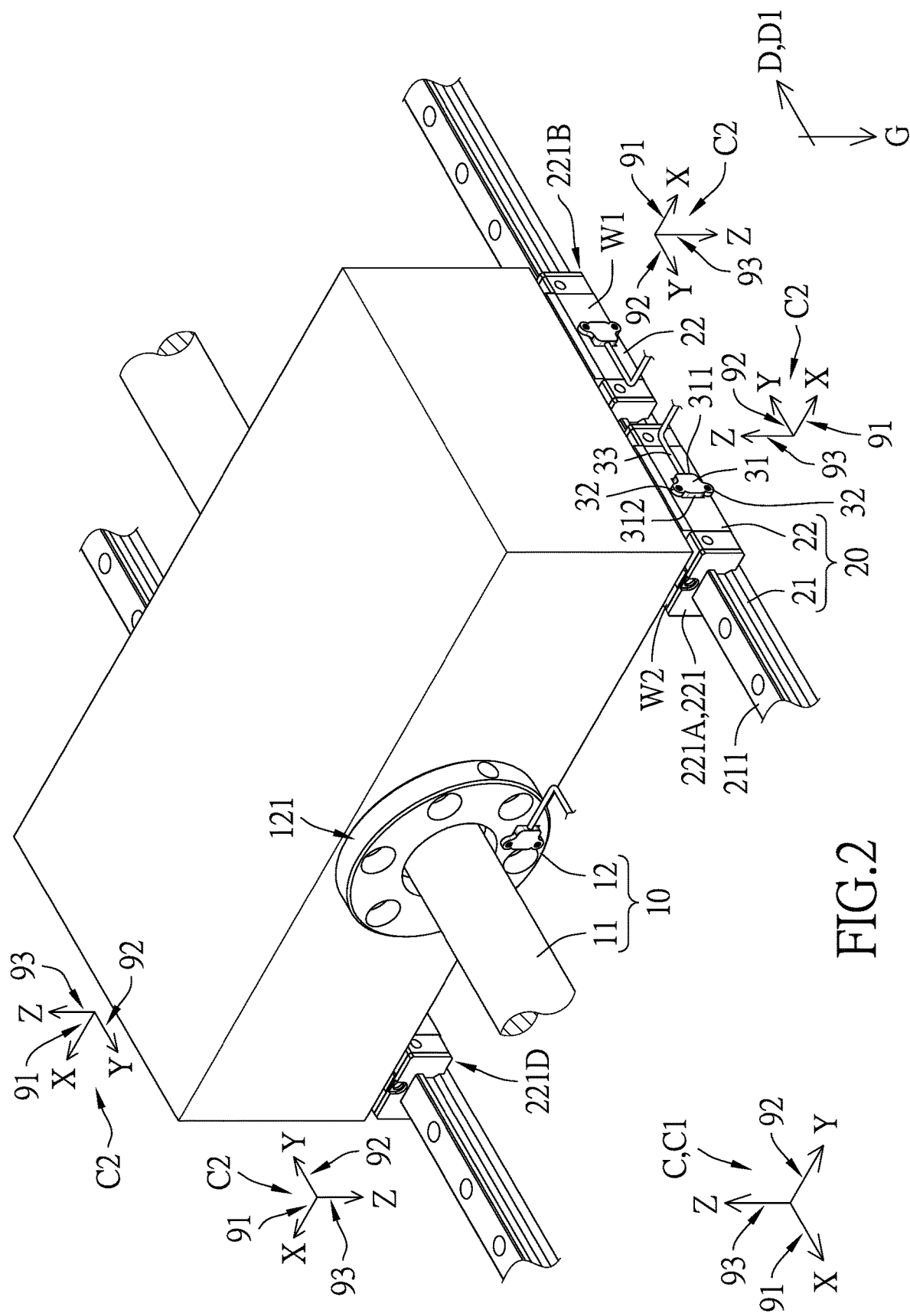
FIG. 2 is a schematic view of one of the feed systems.

Continuing, please refer to FIG. 2, the X-axis of the first coordinate system C1 refers to the direction in which the front and rear ends of the first elongated shaft 11 extend, the Y-axis refers to the direction in which the left and right sides of the first elongated shaft 11 extend, and the Z-axis refers to the direction in which the upper and lower ends of the first elongated shaft 11 extend. Therefore, the Z-axis direction is subject to a positive acceleration (gravity) of 1 g. The X-axis of the second coordinate system C2 refers to the direction in which the left and right sides of the second elongated shaft 21 extend, the Y-axis refers to the direction in which the front and rear ends of the second elongated shaft 21 extend, and the Z-axis refers to the direction in which the upper and lower ends of the second elongated shaft 21 extend. Therefore, the Z-axis direction is subject to an acceleration of 1 g (gravity) or an acceleration of −1 g (gravity).

In this embodiment, referring to FIGS. 2 to 3C, the first sliding member 12 and the second sliding members 22 each includes at least one side surface W and an accommodating hole 50. The accommodating hole 50 is located on the side surface W, and the sensors 30 are installed in the accommodating hole 50. The accommodating hole 50 of the first sliding member 12 is located on the side surface W perpendicular to the driving direction D, and the accommodating hole 50 of the second sliding member 22 is located on the side surface W parallel to the driving direction D. For example, when the first sliding member 12 is a nut 121, the side surface W perpendicular to the driving direction D may be an end surface of a flange 121A. When the second sliding member 22 is the sliding block 221, the side surface W parallel to the driving direction D can be the planes of the sliding block 221 facing the left and right sides of the rail 211, so that the first coordinate system C1 and the second coordinate system C2 can indicate the driving direction D with different axes 91 and 92.

The accommodating hole 50 of the first sliding member 12 of each feed system S needs to be located on the same side surface W of each first sliding member 12. For example, when the first sliding members 12 are nuts 121, the accommodating hole 50 on each of the nuts 121 must be located on the end surface of the flange 121A of the nuts 121.

In this embodiment, referring to FIG. 3C, the shapes of the sensors 30 and the accommodating holes 50 are all asymmetrical to ensure the orientation (installation direction) of the sensors 30.

Figure 3A:
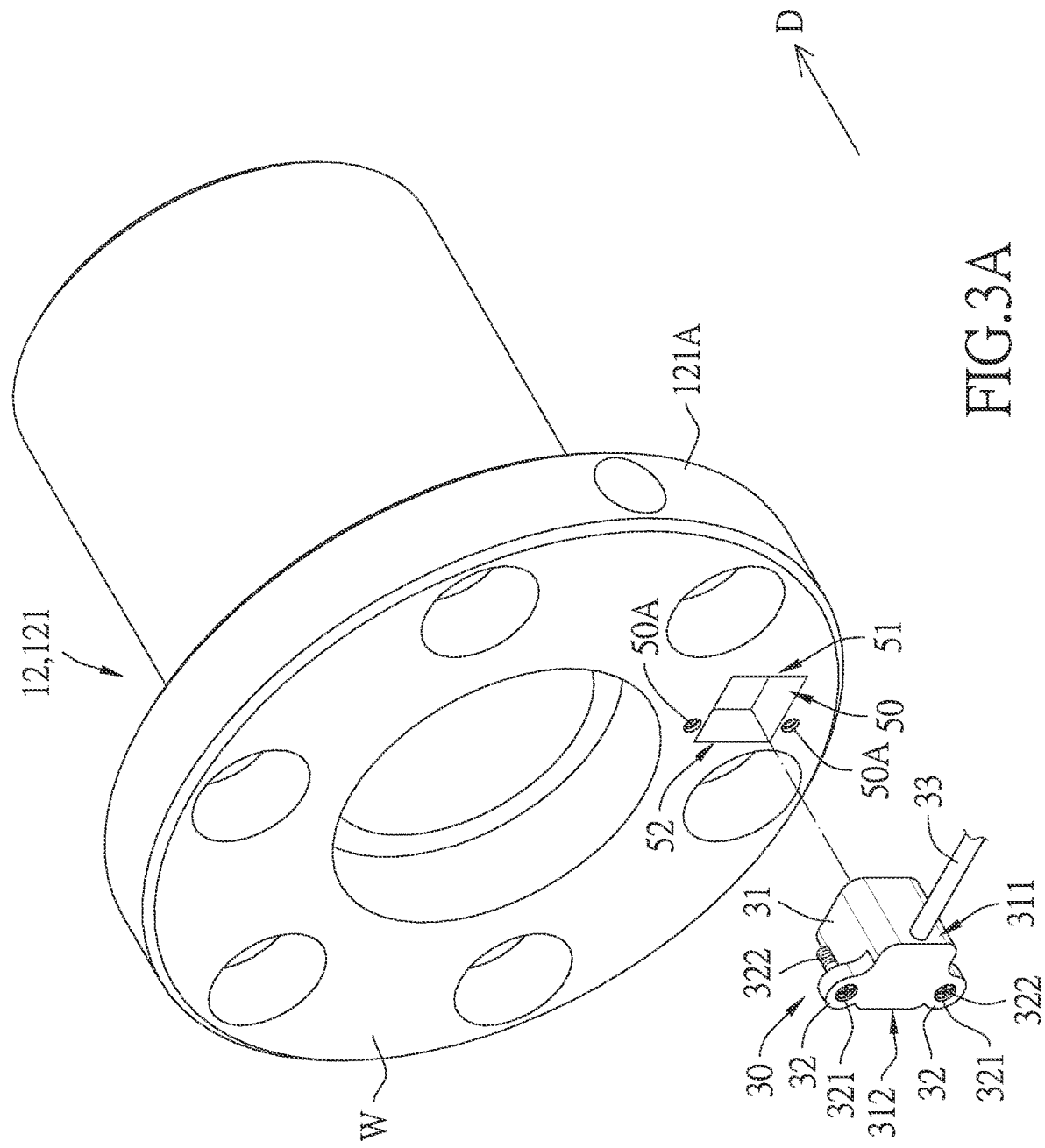
FIG. 3A is a schematic view of a nut having a mounting hole for mounting a sensor.
Figure 3B:
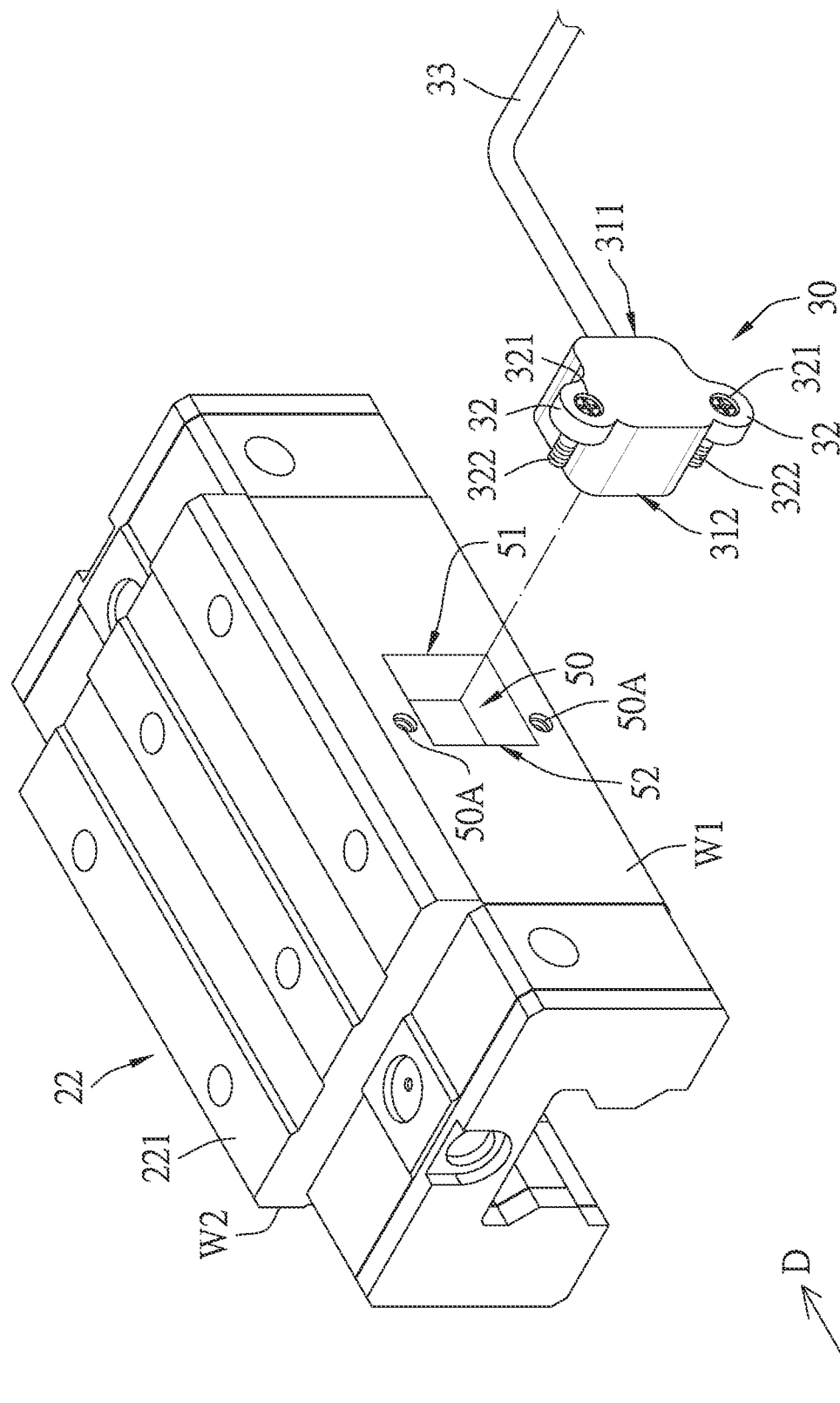
FIG. 3B is a schematic view of the slider having mounting holes for mounting the sensors.

In a preferred embodiment, referring to FIGS. 3A to 3C, the first sliding member 12 and the second sliding members 22 each include two locking holes 50A, and the two locking holes 50A are located at two opposite sides of the accommodating hole 50. It is defined that the accommodating hole 50 includes a first end 51 and a second end 52 opposite to each other. The two locking holes 50A are located closer to the first end 51 or the second end 52, so that the two locking holes 50A are prevented from being aligned with the center of the accommodating hole 50. The sensors 30 each include a main body portion 31 and two locking protrusions 32 located on two opposite sides of the main body portion 31. The main body portion 31 includes a front end 311 and a rear end 312, the two locking protrusions 32 are closer to the front end 311 or the rear end 312, and thus are prevented from being aligned to the center of the main body portion 31. Each of the locking protrusions 32 includes a through hole 321, the through holes 321 are aligned with the locking holes 50A, and a locking member 322 is inserted through each of the through holes 321 and a corresponding one of the locking holes 50A to lock the sensors 30 in the accommodating holes 50 to ensure orientation of the sensors 30.

In a preferred embodiment, the accommodating holes 50 are located on different side surfaces W of the second sliding members 22 to change the installation direction or orientation of the sensors 30. For example, the second sliding member 22 is a sliding block 221, as shown in FIGS. 2 and 3B, the sliding block 221 includes a first side surface W1 and a second side surface W2 which face the left and right side surfaces W of the rail 211, respectively. The accommodating holes 50 can be located on the first side surface W1 or the second side surface W2.

Figure 4:
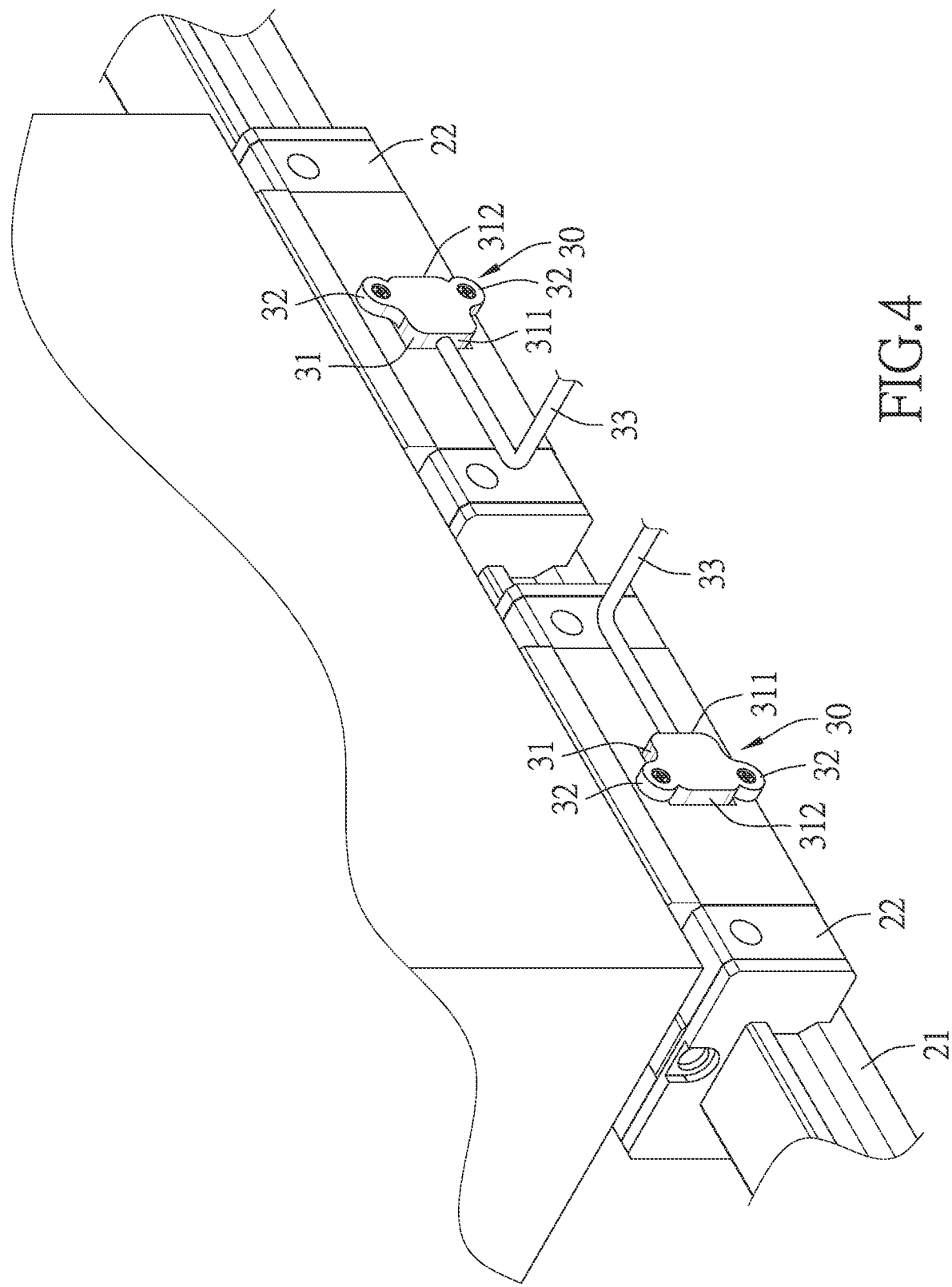
FIG. 4 is a schematic view of the front ends of the sensors facing each other.

In a preferred embodiment, referring to FIG. 4, the sensors 30 each include a transmission line 33 connected to the front end 311 of the main body portion 31, and the sensors 30 on neighboring second sliding members 22 are adjacently arranged, and the front ends 311 of adjacent sensors 30 face each other.

Figure 5:
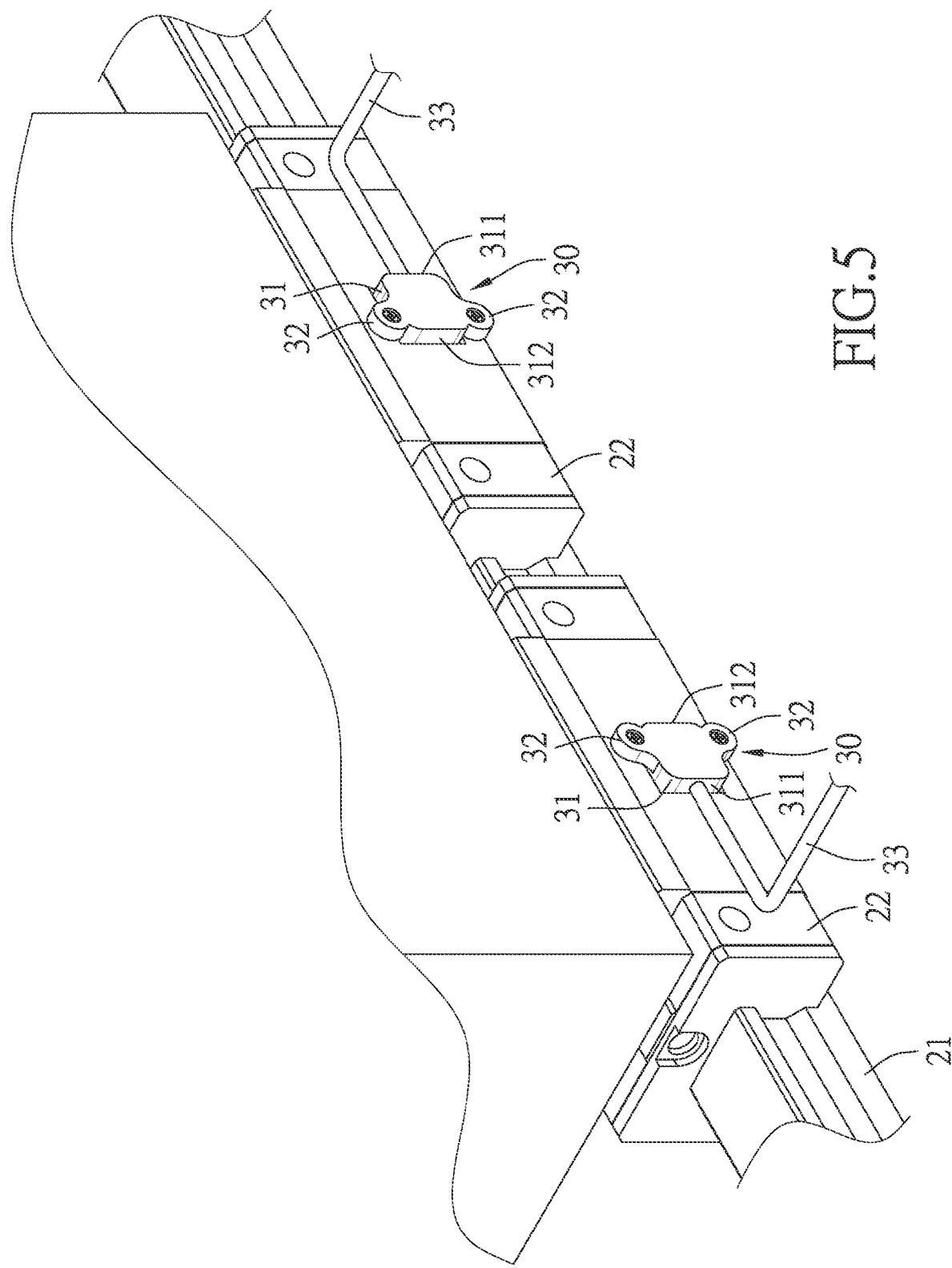
FIG. 5 is a schematic view of the front ends of the sensors facing away from each other.
Figure 6:
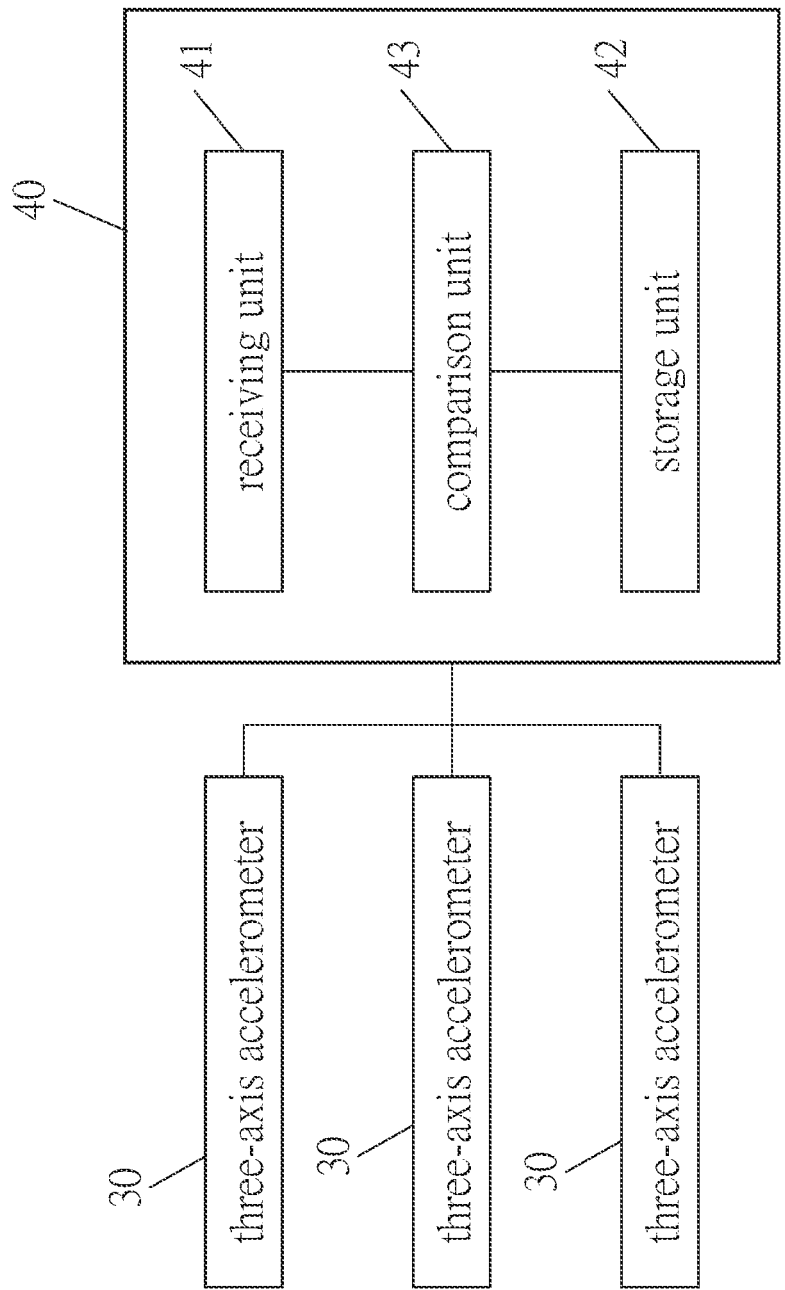
FIG. 6 is a schematic view showing that the sensor and the processing device are signally connected.

In a preferred embodiment, as shown in FIG. 5, the sensors 30 on neighboring second sliding members 22 are arranged adjacently, and the front ends 311 of the adjacent sensors 30 are opposite to each other.

Through the above-mentioned means of fixing the direction of the sensors 30, the second coordinate systems C2 can indicate the driving direction D through different directions of the same axis 92, or indicate the gravity direction G through different directions of the same axis 93.

The foregoing is the embodiment of the present invention and the description of the main components and configuration.

Figure 10:
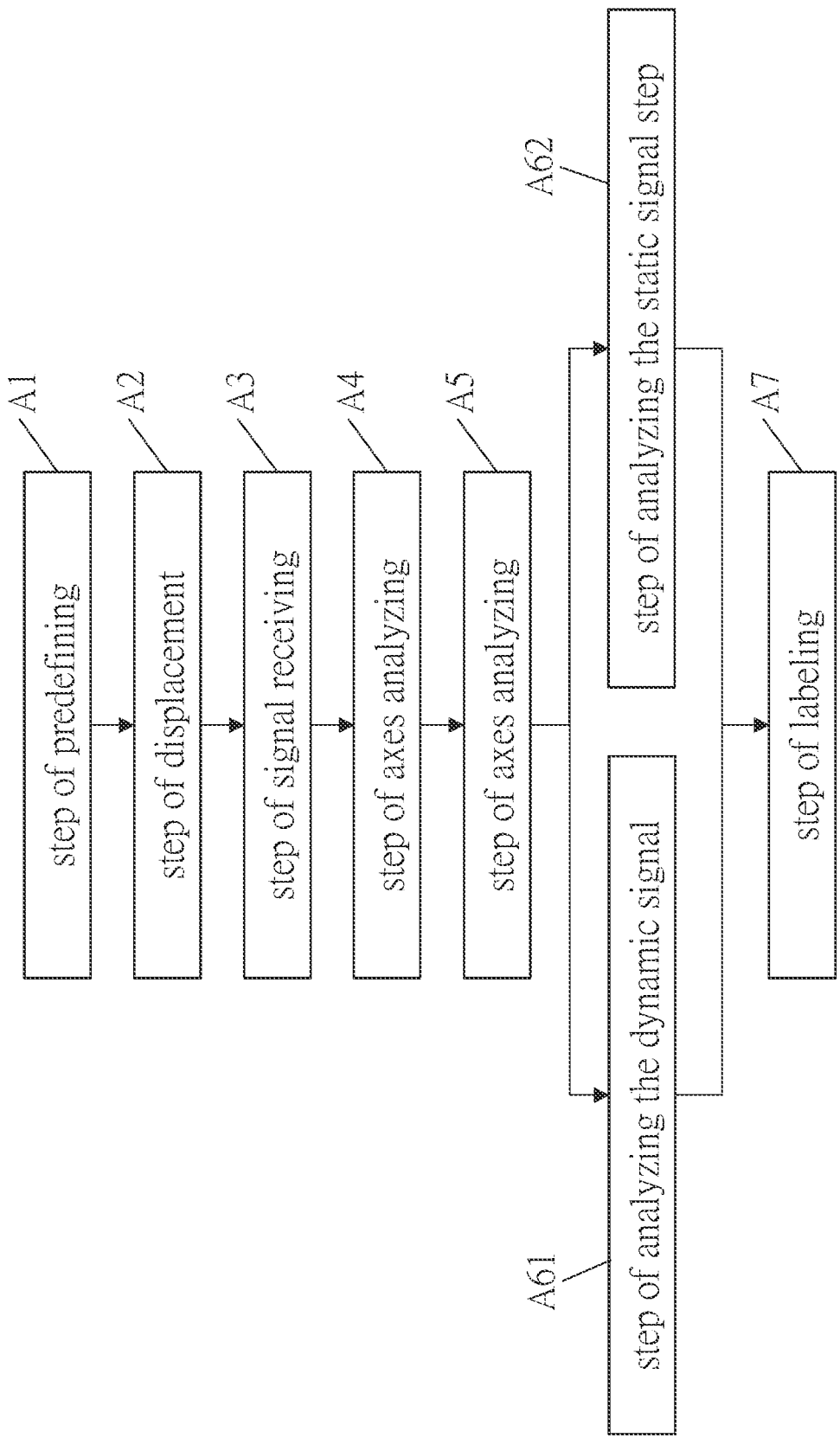
FIG. 10 is a flowchart of the identification method.

Referring again to FIG. 10, a method for identifying the installation position of the sensors in the embodiment of the present invention comprises:

A step A1 of predefining: Defining the comparison information according to the installation direction of the sensors 30. The comparison information contains a corresponding relationship between the first sliding member 12, the second sliding member 22 and a signal feature, and the signal feature includes a coordination feature, a dynamic signal feature, and a static signal feature.

A step A2 of displacement: driving the first sliding member 12 and the second sliding member 22 of one of the feed systems S to move, preferably, driving the first sliding member 12 and the second sliding member 22 to move back and forth repeatedly. For example, when the number of feed systems S is three, namely the first feed system S1, the second feed system S2, and the third feed system S3, the driving direction D of the first feed system S1 is the first direction D1, the driving direction D of the second feed system S2 is the second direction D2, and the driving direction D of the third feed system S3 is the third direction D3. In this embodiment, the first sliding member 12 and the second sliding member 22 of the first feed system S1 are driven to move along the first direction D1.

A step A3 of signal receiving: receiving the three-axis signals L of the sensors 30 in the respective feed systems S, and the three-axis signals L each include output signals of three axes 91, 92 and 93;

A step A4 of axes analyzing: determining responsive three-axis signals from three-axis signals L. Please refer to FIG. 7, the output signal of each axis 91, 92 or 93 is static, which means that the output signal is a non-responsive three-axis signal L. Please also refer to FIGS. 8A and 8B, the output signal of one axis 91 or 92 has an obvious response, while the output signals of the other two axes 91, 92 or 93 have a slight response, which means that the three-axis signal L is a responsive three-axis signal L, and the sensor 30 having the responsive three-axis signal L is installed on the first sliding member 12 or the second sliding member 22 that are moving. Otherwise, it is determined as the three-axis signal L is generated by the sensor 30 installed on the stationary feed system S; In this embodiment, the responsive three-axis signal L is determined to be generated from the sensor 30 installed in the first feed system S1, and the non-responsive three-axis signal L is determined to be generated from the sensor 30 installed on the second feed system S2 or the third feed system S3.

A step A5 of determining the first coordinate system: identifying the axis 91, 92 or 93 with the largest response from each of the responsive three-axis signals L, and among the three-axis signals, there will be multiple three-axis signals L with the largest response on the same axis 92, and one three-axis signal L with a the largest response on another axis 91. Identifying multiple three-axis signals L with the largest response on the same axis 92, and the three-axis signal L with a the largest response on another axis 91. Defining the multiple three-axis signals L with the largest response on the same axis 92 as the second signals L2, and the three-axis signals L with the largest response on another axis 91 as the first signals L1, the second signals L2 correspond to the sensors 30 of the second sliding member 22, and the first signals L1 correspond to the sensors 30 of the first sliding member 12. The axis 91 or 92 with the largest response is the coordinate feature, the three-dimensional coordinate system C corresponding to the first signal L1 is the first coordinate system C1, and the three-dimensional coordinate system C corresponding to the second signal L2 is the second coordinate system C2. In this embodiment, please refer to FIG. 2, 8A, 8B, there are a plurality of three-axis signals L with the largest response on the Y-axis and a three-axis signal L with the largest response on the X-axis. The three-axis signals L with the largest response on the Y-axis are the second signals L2, and the three-axis signal L with the largest response on the X-axis is the first signal L1, so as to identify the sensor 30 mounted on the first sliding member 12.

In this embodiment, the method of determining the axis 91, 92 or 93 with the largest response is as follows: first finding out the axis 93 affected by gravity, and calculating the output signal of the axis 93 in an average manner to obtain an average value, then subtracting the average value from the output signal of the axis 93 to obtain an adjustment signal, and then remove the influence of gravity, and then calculate the root mean square value of the adjustment signal and the root mean square value of the output signals of other axes 91 and 92, and comparing the root mean square values of the respective axes 91, 92 and 93 can get the axis 91, 92 or 93 with the largest response.

Figure 9:
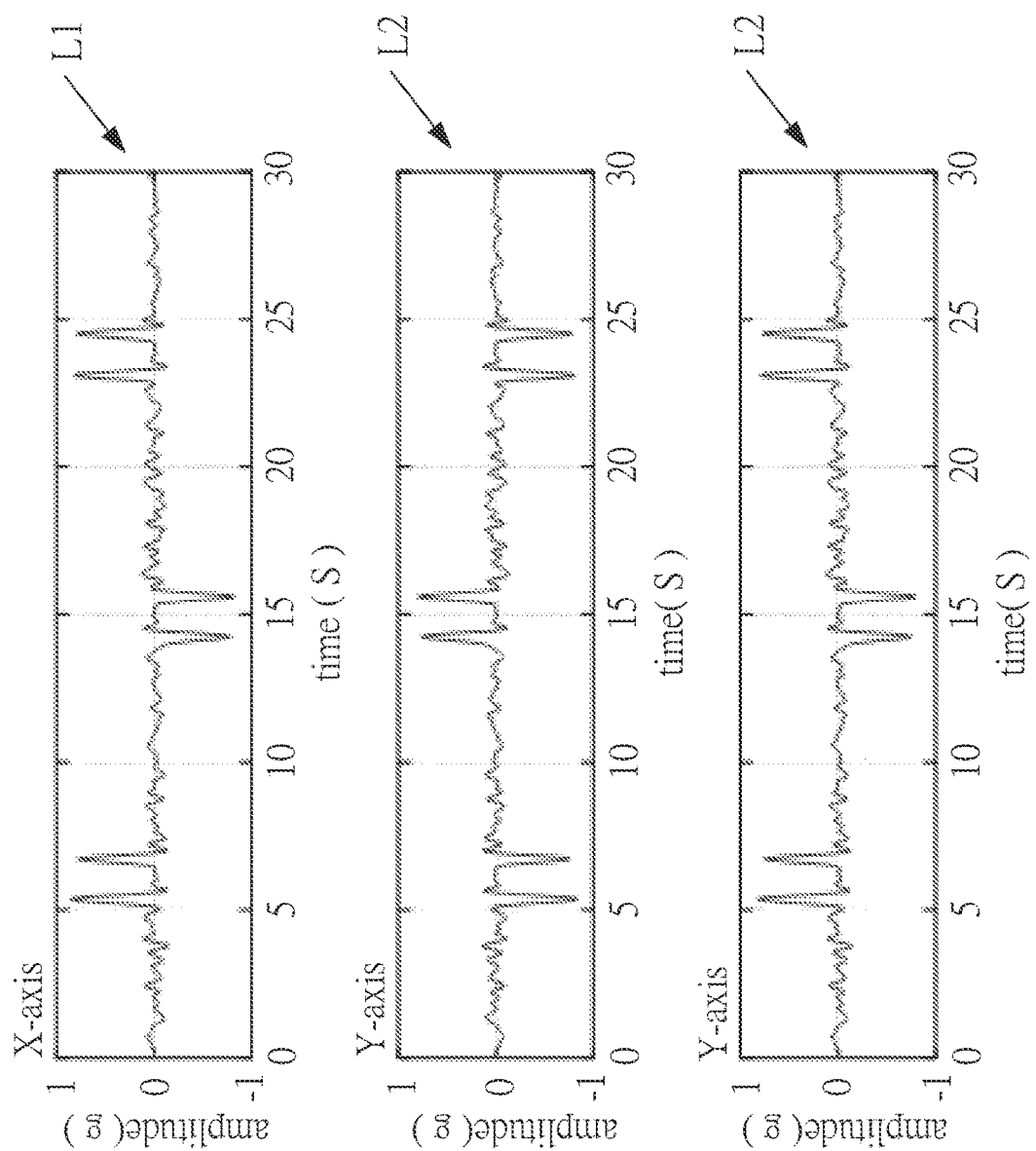
FIG. 9 shows the comparison of the output signal of the axis with the largest response of the first signal and the output signal of the axis with the largest response of the second signal.

A step A61 of analyzing the dynamic signal: Analyzing the first signal L1 and the second signals L2, comparing the first signal L1 with the respective second signals L2, and comparing the output signals of the axes 91 and 92 with the largest response, please refer to FIG. 9, determining the similarity and difference between the oscillation direction of the first signal L1 and the oscillation direction of each second signal L2. The above determination result is the dynamic signal feature;

A step A62 of analyzing the static signal step: Analyzing the second signals L2, comparing the output signals of the axis 93 corresponding to the gravity direction G, and distinguishing the second signal L2 whose output signal is positive and the one whose output signal is negative, and the above determination result is the static signal feature. It is worth mentioning that the positive or negative of the output signals can be determined by the average value of the output signals. In this embodiment, the average value of the output signals is 1 g or −1 g;

A step A7 of labeling: According to the cross-comparison of the dynamic signal feature, the static signal feature and the comparison information, obtaining the corresponding relationship between each of the second signals L2 and the second sliding member 22, binding the second signals L2 to the specific second sliding member 22 and the sensor 30, and binding the first signal L1 to the specific first sliding member 12 and the sensor 30. In this embodiment, as shown in FIGS. 2 and 9, firstly, determining the dynamic signal feature, the comparison information defines that the second signal L2 whose oscillation direction is the same as the first signal L1 corresponds to the second sliding block 221B and the third sliding block (not shown), and the second signal L2 whose oscillation direction is opposite to the first signal L1 corresponds to the first sliding block 221A and the fourth sliding block 221D, and then determining the static signal feature. As shown in FIG. 2, the comparison information defines that the second signal L2 whose output signal of the axis 93 corresponding to the direction of gravity G is positive corresponds to the first sliding block 221A and the third sliding block (not shown), and the second signal L2 whose output signal of the axis 93 corresponding to the direction of gravity G is negative corresponds to the second sliding block 221B and the fourth sliding block 221D. And then by cross-comparison, the corresponding relationship between each second signal L2 and the sliding block 221 can be obtained to identify the sensor 30 installed on each of the second sliding members 22. The above examples do not limit the order of determining the dynamic signal feature and the static signal feature, and it is also possible to determine the static signal feature first and then the dynamic signal feature or simultaneously.

In this way, this invention mainly predefines the corresponding relationship between the first sliding member 12, the second sliding member 22 and the signal features according to the installation directions of the sensors 30, and then drives the first sliding member 12 and the second sliding member 22 of one of the feed systems S to move to obtain and analyze the three-axis signals L fed back from the sensors 30, firstly select responsive three-axis signals L, and then determine the axis 91 or 92 of the three-axis signals L that has the largest response so as to identify the sensor 30 installed on the first sliding member 12. Then, the corresponding relationship between the remaining three-axis signals L and the sensors 30 installed on the second sliding members 22 is identified based on the dynamic signal feature and the static signal feature, so as to achieve the purpose of automatically identifying the installation position of the respective sensors.

What is claimed is:

1. An identification system for identifying installation positions of sensors, comprising:
at least one feed systems linearly movable along a driving direction, and including a first sliding member, and a plurality of second sliding members;
the sensors respectively installed on the first sliding member and the second sliding members, wherein each of the sensors defines a three-dimensional coordinate system and forms a three-axis signal, each of the three-dimensional coordinate systems includes three axes, one of the axes corresponds to a gravity direction, each of the three-axis signals includes a signal feature, the three-dimensional coordinate system formed by the sensor mounted on the first sliding member is a first coordinate system, the three-dimensional coordinate systems formed by the sensors mounted on the second sliding members are second coordinate systems, the first coordinate system and the second coordinate systems use different axes to indicate the driving direction, and the second coordinate systems indicate the driving direction with different directions of the same axis or uses different directions of the same axis to indicate the gravity direction; and
a processing device storing a comparison information, the comparison information containing a corresponding relationship between the first sliding member, the second sliding members and the signal feature, the processing device comparing the three-axis signals to obtain the signal feature, and obtain the installation positions of the sensors based on the comparison information;
wherein the axes are perpendicular to one another, the signal feature includes a dynamic signal feature and a static signal feature, define the three-axis signal of the sensor mounted on the first sliding member as a first signal, and the three-axis signals of the sensors mounted on the second sliding members as second signals, compare output signals of the axes with the largest response of the first signal and each of the second signals, the similarity or difference of oscillation directions of the output signals is the dynamic signal feature, compare the second signals with the output signal of the axis corresponding to the gravity direction, and positive or negative value of the output signal is the static signal feature;
the first sliding member and the second sliding members each include an accommodating hole, the sensors are disposed in the accommodating holes, the shape of the accommodating holes is directional for fixing the direction of the three-dimensional coordinate systems after the sensors are installed in the accommodating holes.

2. The identification system for identifying installation positions of the sensors as claimed in claim 1 further comprising a plurality of said feed systems, and the driving directions of the feed systems are perpendicular to one another.

3. The identification system for identifying installation positions of the sensors as claimed in claim 1, wherein the feed system further includes a first elongated shaft and a plurality of second elongated shafts, the first sliding member is sleeved on the first elongated shaft, and the second sliding members are sleeved on the second elongated shafts, the first sliding member is a nut, the first elongated shaft is a screw rod, each of the second sliding members is a sliding block, and each of the second elongated shafts is a rail.

4. The identification system for identifying installation positions of the sensors as claimed in claim 1, wherein the first sliding member and the second sliding members each include a plurality of side surfaces and an accommodating hole located in one of the side surfaces, the sensors are disposed in the accommodating holes, the accommodating hole of the first sliding member is located in the side surface perpendicular to the driving direction, and the accommodating hole of each of the second sliding member is located in the side surface parallel to the driving direction.

5. The identification system for identifying installation positions of the sensors as claimed in claim 1, wherein each of the sensors includes a main body and a transmission line, the main body includes a front end and a rear end, the transmission line is connected to the front end, and the sensors on neighboring second sliding members have their front ends facing each other.

6. A method for identifying installation positions of sensors comprising the following steps:
(A) defining a corresponding relationship between a first sliding member, a plurality of second sliding members and a signal feature, the signal feature including a dynamic signal feature and a static signal feature, wherein the first sliding member and the second sliding members each include an accommodating hole, each of the sensors defines a three-dimensional coordinate system, the sensors are disposed in the accommodating holes, the shape of the accommodating holes is directional for fixing the direction of the three-dimensional coordinate systems after the sensors are installed in the accommodating holes;

(B) driving the first sliding member and the second sliding members to linearly move in a driving direction;

(C) receiving three-axis signals transmitted from the sensors installed on the first sliding member and the second sliding members, each of the three-axis signals including an output signal for each of three axes;

(D) identifying the axis with the largest response from each three-axis signal, the three-axis signals with the largest response on the same axis corresponds to the sensors installed on the second sliding members, and the three-axis signal with the largest response on another axis corresponds to the sensor installed on the first sliding member, so as to identify the sensor installed on the first sliding member;

(E) defining the three-axis signal of the sensor mounted on the first sliding member as a first signal, and the three-axis signal of the sensor mounted on each of the second sliding members as a second signal, comparing the output signal of the axis with the largest response of the first signal with the output signal of the axis with the largest response of the second signals, and determining the similarity and difference of the oscillation directions of the output signals to obtain a determination result, and the determination result is the dynamic signal feature;

(F) comparing each of the second signals with the output signal of the axes corresponding to a gravity direction, distinguishing the second signals whose output signal is positive and the second signals whose output signal is negative to obtain a result, and the result is the static signal feature; and (G) obtaining corresponding relationship between each of the second signals and the second sliding members based on the dynamic signal feature and the static signal feature, so as to identify the sensors installed on the respective second sliding members.

7. The method for identifying installation positions of sensors as claimed in claim 6, in the step (D), calculating the output signal of the axis corresponding to the gravity direction to obtain an average value, then subtracting the average value from the output signal of the axis to obtain an adjustment signal, and then calculating a root mean square value of the adjustment signal and the root mean square value of the output signals of other axes, and comparing the root mean square values of the respective axes to get the axis with the largest response.

8. The method for identifying installation positions of sensors as claimed in claim 6, wherein in the step (E), the output signal of the axis with the largest response of the first signal and the output signal of the axis with the largest response of one of the second signals have opposite positive and negative values, and the output signal of the axis with the largest response of the first signal and the output signal of the axis with the largest response of another of the second signals have the same positive and negative values.

* * * * *